June 19, 1923.                                        1,459,106
H. J. KNERR
GASOLINE CONSUMPTION INDICATOR FOR MOTOR VEHICLES
Filed June 24, 1921        3 Sheets-Sheet 1
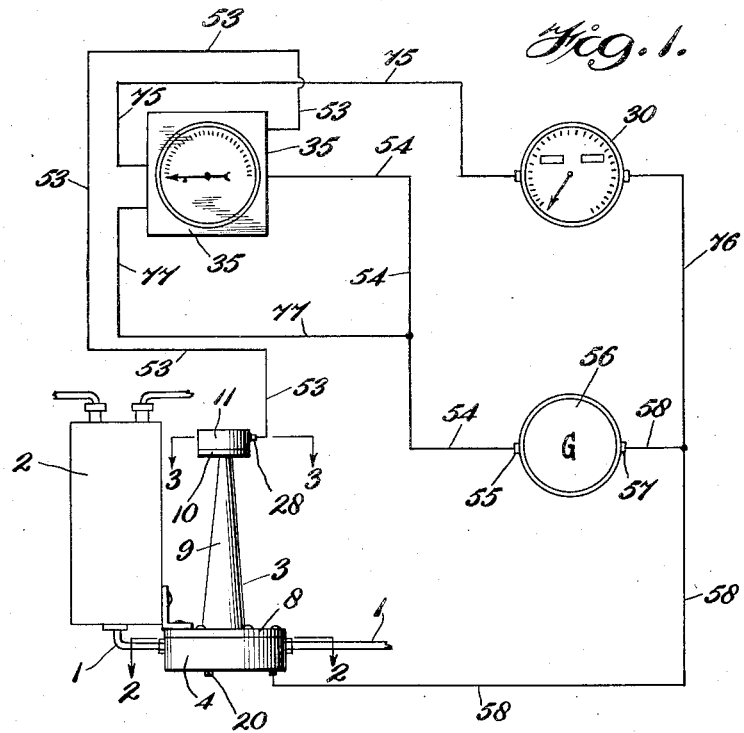
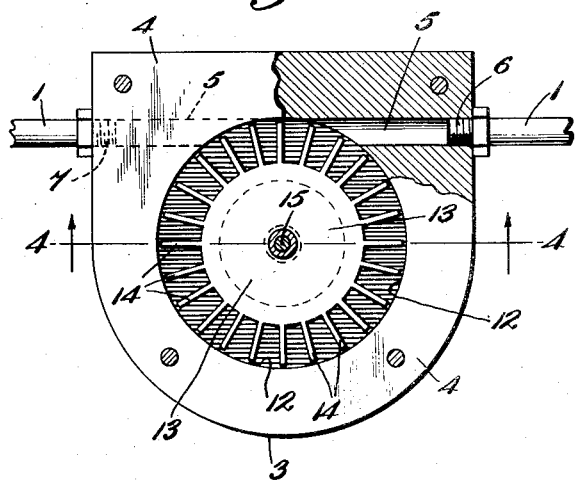
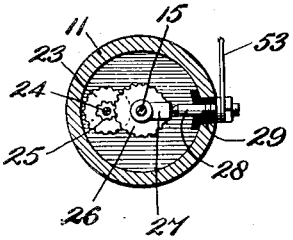
Inventor
Hugh J. Knerr,
By T. G. Witherspoon
Attorney

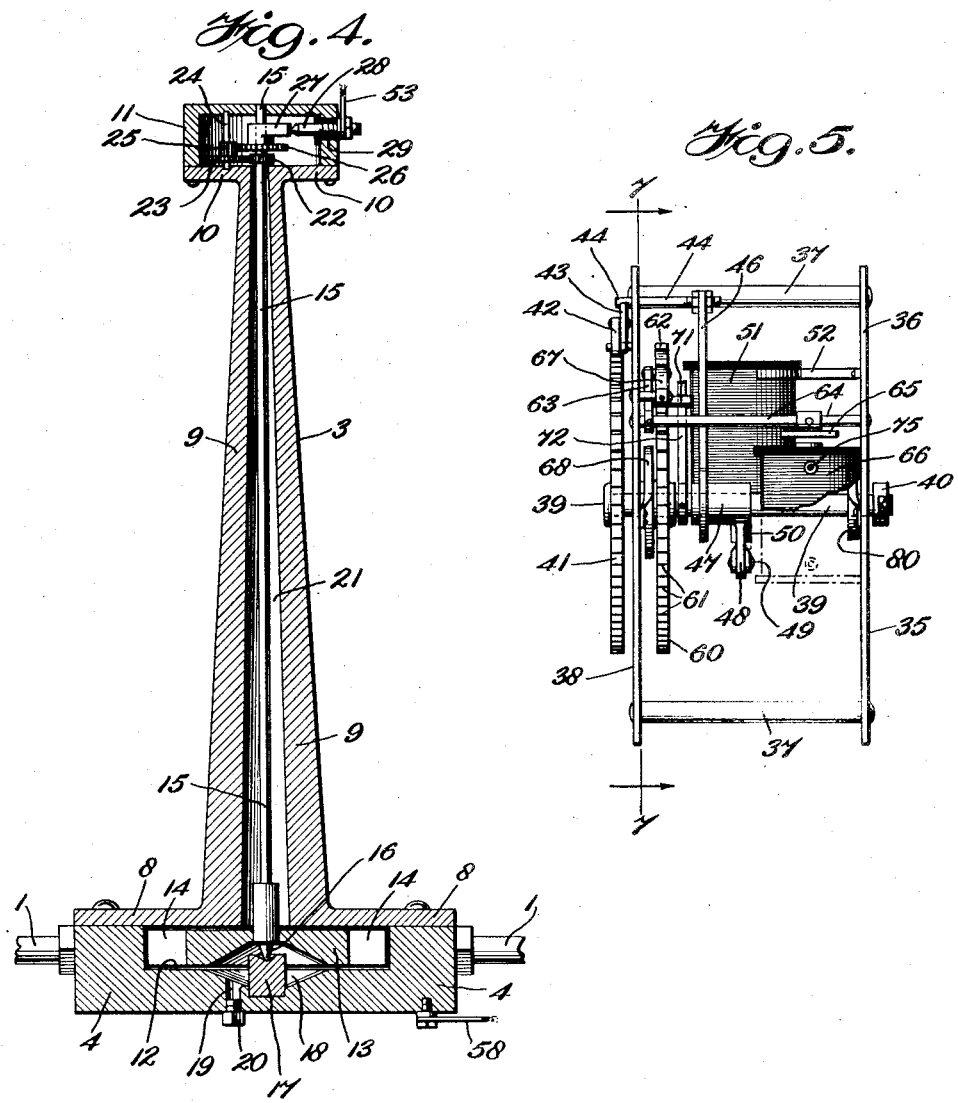

June 19, 1923.
H. J. KNERR
1,459,106
GASOLINE CONSUMPTION INDICATOR FOR MOTOR VEHICLES
Filed June 24, 1921   3 Sheets-Sheet 3
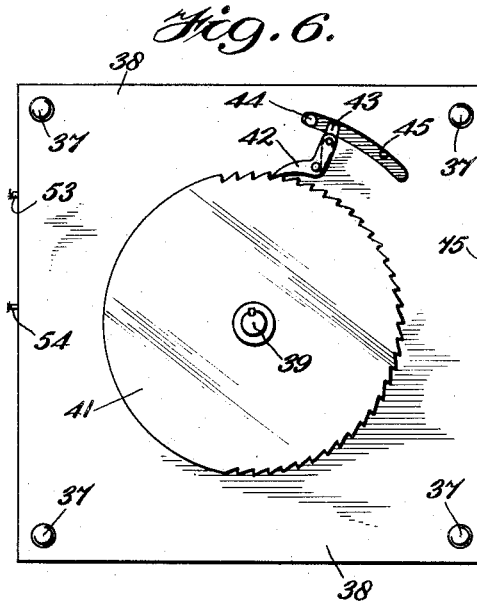
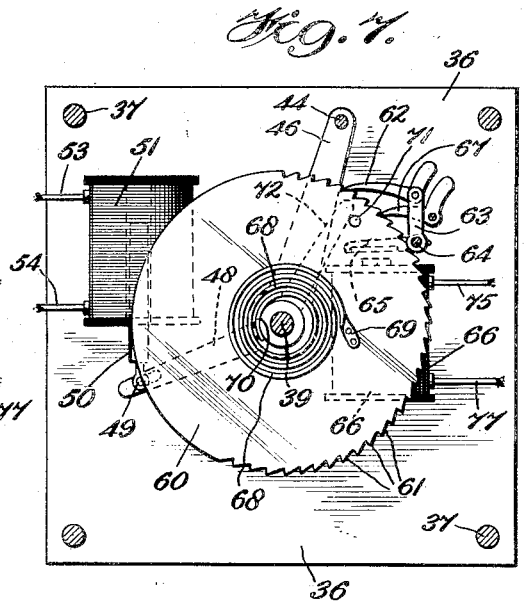
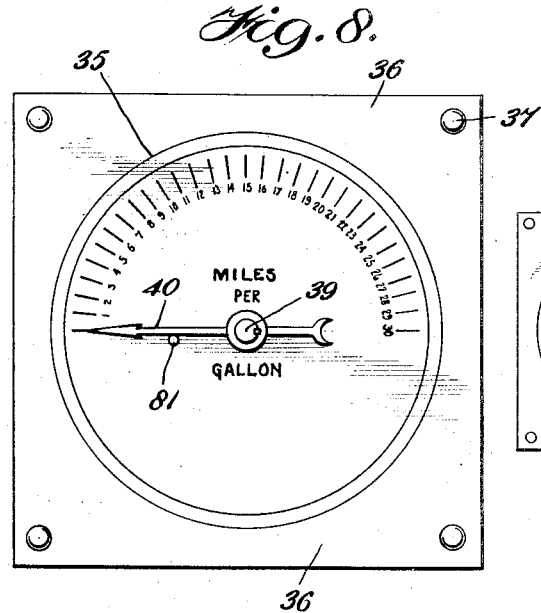
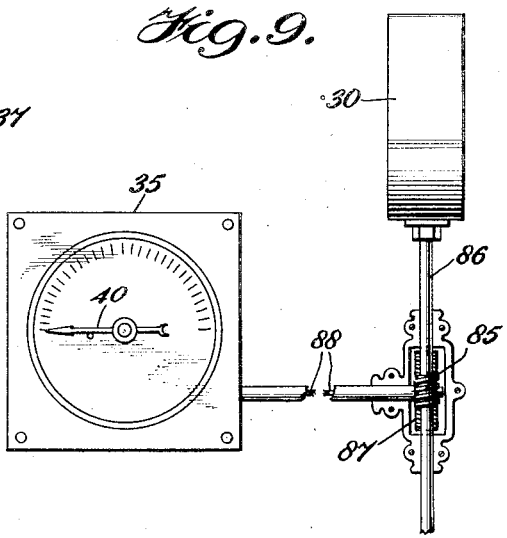
Inventor
Hugh J. Knerr,
By T. C. Witherspoon
Attorney Patented June 19, 1923.

1,459,106

UNITED STATES PATENT OFFICE.

HUGH J. KNERR, OF THE UNITED STATES ARMY.

GASOLINE-CONSUMPTION INDICATOR FOR MOTOR VEHICLES.

Application filed June 24, 1921. Serial No. 480,170.

*To all whom it may concern:*

Be it known that I, HUGH J. KNERR, a major in the United States Army, and a citizen of the United States, at present stationed at Fort Barrancas, in the county of Escambia and State of Florida, have invented certain new and useful Improvements in Gasoline-Consumption Indicators for Motor Vehicles; and I do hereby declare the following to be a full, clear, and exact description of the invention, such as will enable others skilled in the art to which it appertains to make and use the same.

This invention relates to gasoline consumption indicators for motor vehicles, and more especially to apparatus of this type which will indicate the number of miles obtained from a given quantity of motor fuel, and has for its object to provide a device of this character, which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a diagrammatic elevational view of one form of apparatus constructed in accordance with the present invention, illustrating the electrical circuits connecting the various elements of the device;

Figure 2 is a horizontal sectional view on an enlarged scale of the fluid metering device illustrated in Figure 1, taken approximately on the line 2—2 of the said figure, looking down;

Figure 3 is a view similar to Figure 2, taken approximately on the line 3—3 of Figure 1, looking in the direction of the arrows;

Figure 4 is a central vertical sectional view on an enlarged scale of the said fluid metering device shown in Figure 1;
Figure 5 is a side elevational view partly broken away, of the indicating device shown in Figure 1;

Figure 6 is a rear elevational view of the parts shown in Figure 5, as seen from the left of the said figure;

Figure 7 is a transverse vertical sectional view of the parts shown in Figure 5, taken approximately on the line 7—7 of the said figure, looking in the direction of the arrows;

Figure 8 is a front elevational view of the indicator shown in Figure 5, as seen from the right of said figure; and Figure 9 is a diagrammatic elevational view of a slightly modified form of the apparatus.

Referring more especially to Figure 1, 1 indicates a portion of the fuel feed line of a motor vehicle which may be provided with the usual vacuum tank 2, and the said feed pipe 1 is cut to receive the fluid measuring device 3 forming a portion of the present invention. The said device 3 may be of any suitable construction, but is here shown as comprising a base member 4, provided with a transverse bore 5 into which is adapted to be threaded the ends 6 and 7 of the fuel feed pipe 1, as will be clear from Figures 1 and 2. Secured to the said base member 4 as by the flange 8 is the upright standard 9 provided at its upper end with a flange 10 to which may be secured the cap member 11, see Figures 1 and 4.

The base 4 is preferably provided with a circular recess 12, the outer periphery of which intersects the bore 5 as is clear from Figure 2, which recess is adapted to accommodate a revoluble member 13 provided with the vanes 14 rigidly mounted upon a shaft or spindle 15, which shaft or spindle may be provided with a suitable anti-friction bearing 16, see Figure 4. The said bearing 16 may rest upon the bearing block 17, rigid with the base member 4 and surrounded by the conical depression 18, from which leads the drain opening 19 normally closed by the drain plug 20, as will be readily apparent from the drawings.

The standard 9 is preferably hollow as shown, the spindle 15 extends upwardly through the bore 21 of the said standard and has its upper end journalled in any suitable manner, as in the cap member 11. Said spindle 15 carries near its upper end a pinion 22 which pinion meshes with the gear 23 carried by a stub shaft 24, which stub shaft is provided with a pinion 25 meshing with a gear 26 loosely mounted upon the said spindle 15, see Figures 3 and 4. Rigidly secured to the said gear 26 is a contact member 27 also loosely mounted upon the said spindle 15, which contact member is adapted to make circuit with the companion contact member 28 carried by the housing 11, and insulated therefrom as by the insulating bushing 29.

From what has thus far been disclosed, it will be apparent that as fuel passes along the fuel feed pipe 1 it will enter the bore 5 within the base member 4 of the metering device and will come into contact with the vanes 14 of the wheel 13, thus causing the said wheel to revolve. The motion of the said wheel will be transmitted to the spindle 15 and in turn to the pinion 22, gear 23, pinion 25, gear 26 and contact member 27. The ratios of the pinions 22 and 25 to their respective gears 23 and 26 are so chosen that for each gallon of motor fuel which passes through the pipe 1 and bore 5, the contact member 27 will be revolved once, thereby closing circuit with the contact member 28, once for the passage of such an amount of gasoline.

Referring now more especially to Figures 1, 5, 6, 7, and 8, 30 designates the usual speedometer or other meter carried by a motor vehicle for indicating the speed in miles per hour, as well as the total number of miles traveled. This speedometer in the present instance is equipped with any suitable form of electrical contact making device such, for example, as one similar to that disclosed in connection with the gasoline metering device 3, which contact maker is adapted to close the circuit once for each mile traveled. 35 designates an indicating device which is adapted to combine the measurements obtained from the gasoline measuring apparatus 3 and the speedometer 30 to give the number of miles obtained from each gallon of gasoline. Said indicator 35 as is best shown in Figures 5 to 8 inclusive, comprises a dial or face plate 36 suitably graduated substantially as shown, to which plate may be secured in spaced relation as by the posts 37 the back plate 38, the whole constituting a supporting framework for the moving parts. Suitably journalled within the said plates 36 and 38 is a shaft 39 having rigidly secured to one end in operative relation with the plate 36, a pointer member 40 and having rigidly secured at or near its other end a ratchet wheel 41. Pivotally secured to the back of the plate 38 in such a position as to co-act with the ratchet 41, is a pawl 42 Fig. 6 which pawl is provided with a pivoted trigger 43 located in the path of and adapted to be struck by, a pin 44, which projects through a slot 45 cut in the said back plate 38 and is carried by an arm 46 rigid with a sleeve or boss 47 loosely mounted upon the said shaft 39. The said sleeve 47 has also rigidly secured to it an angularly extending arm 48 to which is pivotally secured as at 49 the movable core 50 of a solenoid 51 all as will be clear from Figs. 5, 6 and 7. Said solenoid may be supported in any suitable manner as by the support 52 secured to the plate 36, see Figure 5. The coil of the said solenoid 51 is connected as by a wire 53 to the contact member 28, see Fig. 4, while the other end of the said solenoid coil is connected as by a wire 54 to one brush 55 of a suitable generator or other source of current 56, see Fig. 1. The other brush 57 of the said generator may be connected as by the wire 58 to the base member 4 of the gasoline measuring device, the circuit being grounded thereon.

Also loosely mounted upon the shaft 39 is a second ratchet wheel 60, Figs. 5 and 7, provided with teeth 61 which are adapted to be engaged by a pawl 62 pivotally secured to a link 63, rigid with a shaft 64, suitably journaled in the plates 36 and 38, which shaft has rigidly secured to it an armature 65 of an electromagnet 66. A detent 67 is pivotally mounted upon the back plate 38 and is also adapted to engage the teeth 61 of the ratchet wheel 60 and to prevent the reverse rotation thereof except when the said detent is released, as will presently appear.

As above stated, the said wheel 60 is loosely mounted upon the shaft 39 and it is provided with a coil spring 68, one end 69 of which is secured to the back plate 38, the other end 70 being secured to the hub of the said wheel 60. The parts are so constructed, that upon the energization of the electromagnet, its armature will be attracted and through the medium of the jack shaft 64, link 63, and pawl 62, the wheel 60 will be moved in a counterclockwise direction, as seen in Figure 7, and it will be retained in such position by the detent 67 when the magnet 66 is de-energized. The movement of the wheel 60 in this direction will wind up the spring 68, so that the tendency thereof will be to turn the wheel 60 in a clockwise direction when the pawl 62 and detent 67 are tripped, as will presently appear.

Rigidly mounted upon the said wheel 60 and projecting therefrom at substantially right angles to its face is a pin 71 adapted to engage an arm 72 rigid with the shaft 39. It thus results that when the magnet 66 is energized, its armature 65 will be attracted and through the medium of the pawl 62, the wheel 60 will be moved in a counterclockwise direction until the pin 71 engages the arm 72, whereupon the said pin will move the said arm in the same direction carrying with it the shaft 39, ratchet wheel 41, and the pointer 40. The magnet 66 is connected as by the wire 75 to one of the contact members of the electrical circuit, making and breaking device, within the speedometer 30, the other member of the said circuit maker and breaker being joined as by the wire 76 to the wire 58 connected to one brush of the generator 56. The other end of the magnet coil 66 is joined as by the wire 77 to the wire 54, leading to the other brush of the said generator, thus forming a complete circuit. 80 indicates a coil spring having one of its ends fastened to the front plate 36 and its other end secured by means not shown to the shaft 39; the tendency of such spring being to turn the shaft 39 and its pointer 40 in a counter-clockwise direction as seen in Figure 8. A pin 81 may project from the said plate 36 to engage the said pointer 40, thereby serving as a stop.

The operation of the device will be clear from the foregoing, but may be briefly summarized as follows:

Supposing the parts to be in the position illustrated in the drawings, which are the initial or zero positions, as gasoline or other fluid fuel flows through the feed pipe 1 it will impinge upon the blades 14 of the wheel 13, causing the same to rotate. The movement of this said wheel will be transmitted through its spindle 15 to the reducing gear train 22, 23, 25, and 26, Fig. 4, so that a slower motion will be imparted to the contact member 27, as was above disclosed. In the meantime, as the vehicle travels over the ground the usual speedometer 30, Figs. 1 and 9, will be actuated in the usual manner, so that the odometer portion thereof will register the total number of miles traveled.

For each mile indicated thereon the well known electrical contact device, not shown, but located within the said speedometer 30, will make one contact, thus closing circuit through the electromagnet 66, located within the indicator 35, associated with said speedometer. The current will pass from the generator 56 by way of the brush 55, wire 54, wire 77, magnet coil 66, wire 75, wire 76, wire 58, back to the other brush 57, of the generator 56, all as will be clear from Figures 1 and 7. Each time such contact is made, the magnet 66 will be energized, its armature 65 will be attracted, thereby rocking the shaft 64, causing the link 63 to force the pawl 62 toward the left, as seen in Figure 7, thereby moving the ratchet wheel 60 one tooth in a counter-clockwise direction for each mile traveled. The wheel 60 will be held in this position by the detent 67, and as soon as the contact within the speedometer 30 is broken the armature 65 will be released, and the other parts will resume their initial position ready to be actuated when another mile is traveled. If necessary, a suitable spring, not shown, may be associated with the armature 65 to insure such return.

The movement of the wheel 60 in a counter-clockwise direction as just explained, when each mile is traveled, will wind up the spring 68, and will also carry the pin 71. Figures 5 and 7, in a counter-clockwise direction. The said pin being in engagement with the arm 72 rigid with the shaft 39, these two latter members will likewise be turned a predetermined distance in the same direction for each mile traveled, and the shaft 39 will carry with it the pointer 40, which latter will move in a clockwise direction of course, as seen in Figure 8, to indicate on the calibrated scale the passage of each mile. The movement of the shaft 39 will also carry with it the ratchet wheel 41, a predetermined distance for each mile traveled, and the teeth of this wheel will slip by the pawl or detent 42 in the usual manner.

The said wheel 41 being rigidly connected to the shaft 39, reverse movement of the said shaft will be prevented by the said pawl 42. This movement of the various parts will continue, the pointer 40 moving one additional calibration each time for the passage of each mile until one gallon of motor fuel has been consumed. When a gallon of fuel has been consumed, the contact member 27 of the gasoline metering device 3, see Figures 1 and 4 will have made a complete revolution and will be brought into engagement with the contact member 28, thereby closing circuit through wire 53, solenoid coil 51, wire 54, generator 56, wire 58, and the metering device 3 itself. The energization of the solenoid coil 51, upon the consumption of each gallon of fuel, will suck in the core 50 in the well known manner, which core 50 will carry with it the arm 48, loose on the shaft 39, causing the said arm to move in a clockwise direction, as seen in Figure 7. The said arm 48 being rigidly connected to the arm 46, through the sleeve 47, see Figures 5 and 7, the said arm 46 will likewise be moved in a clockwise direction, whenever a gallon of fuel has been consumed, as seen in said Figure 7, and the pin 44 carried by said arm 46 will first engage the trigger 43, Figure 6, to trip the pawl or detent 42.

Upon further movement of the arm 46, its pin 44 will engage the extension or tail of the pawl 62, which in turn will strike the extension or tail of the detent 67, thereby disengaging both of these members from the teeth 61 of the ratchet wheel 60, whereupon the latter, together with the pin 71, will return under the influence of its coil spring 68 to its initial position.

It will be observed, however, that when the pawl 42 is disengaged from the ratchet wheel 41 by the action of pin 44, no retrograde movement of said wheel 41 due to the influence of the spring 80 will take place because the shaft 39 with which the wheel is rigid is held against clockwise rotation, as seen in Figure 6 by reason of the arm 72, also rigid with said shaft, contacting with the pin 71, carried by wheel 60, locked by pawl 62, and detent 67, carried by the frame of the device.

When the pin 44 has passed the trigger 43, of the pawl 42, the latter will of course reengage the teeth of the wheel 41 and hold the same in whatever position it may happen to be. Thereafter, when the pin 44 trips the pawl 62 and detent 67, as just explained, the wheel 60 will return to its initial or zero position, the pin 71 will leave the arm 72 rigid on the shaft 39, in its set position, and the parts be positioned for the next registration of mileage. The circuit controlled by the fluid metering device 3 will then be broken by the continued passage of fluid, whereupon the core 50 of the solenoid 51 will be released, whereupon the arm 48, the arm 46, and the pin 44 will return to their initial positions, pin 44 slipping by the pivoted trigger 43 of the pawl 42, without disengaging the latter from the wheel 41.

Therefore, upon the consumption of this first gallon of fuel, the indicator will have been moved around the dial to register the number of miles traveled, and further, said indicator being rigid with the shaft 39 will be held at that particular calibration until moved therefrom, as will presently be shown.

The registration of the number of miles traveled during the consumption of the second or succeeding gallon of fuel will now commence. As before, when each mile is passed, the circuit will be closed to operate the armature 65 of the electromagnet 66, whereupon the ratchet wheel 60 carrying the pin 71 will be revolved tooth by tooth as heretofore described. Should an additional number of miles per gallon of fuel be obtained as over the preceding gallon, the pin 71 will force the arm 72, rigid with shaft 39 and pointer 40 around in a clockwise direction, as seen in Figure 8, thereby moving the said pointer from its former registration to the calibration representing the number of miles obtained on this second gallon of fuel, whereupon contact is made by the contact members 27 and 28, thereby energizing the solenoid 51, and causing the tripping lever 46 to again trip the various parts.

On the other hand, should a less number of miles be obtained from this second or any succeeding gallon of fuel, than was obtained from the preceding gallon, it will be observed that the ratchet wheel 60 will have revolved not so far as before, and consequently the pin 71 carried thereby will not be in contact with the arm 72 when the circuit controlled by the measuring device 3 is closed, and the arm 46 carrying the pin 44 starts to swing. As a result, when said pin 44 trips the trigger 43 of the pawl 42, thus releasing the latter from the teeth of the ratchet wheel 41, the shaft 39 will be free to revolve in its retrograde or clockwise direction, as seen in Figures 6 and 7, due to the action of the spring 80, and the indicator 40, carried by said shaft, will likewise be turned back in the same direction. This backward turn of the wheel 41, shaft 39, and indicator 40, however, will be stopped when the arm 72 also carried by the shaft 39 strikes the pin 71 carried by the wheel 60. This backward revolution is accomplished very quickly, and is completed by the time the pin 44 has passed the trigger 43, thus permitting the wheel 41 to be again held in its newly set position by the reengagement of the pawl 42, so that when the still moving pin 44 contacts and trips the pawl 62 and detent 67, thereby releasing the wheel 60 which thereupon returns to its original or zero position, the indicator 40 will be held stationary so as to register the mileage obtained from the gallon of fuel just consumed. The arm 46 and pin 44, will return upon the breaking of the circuit controlled by the fluid metering device 3 and the parts will again be in position to register the mileage obtained upon the consumption of the succeeding gallon of fuel.

It will now be clear from the foregoing that as each mile is traveled, the ratchet wheel 60 will be turned one notch through the pawl 62, electromagnet 66 and circuit 75, 76 and 77, controlled by the distance measuring means 30. It will also be clear that the pin 71, through the arm 72, will in every case control the position of the pointer 40 so that there will be indicated, on this scale 35, the number of miles that have been obtained from a preceding gallon of fuel. That is, after one gallon of fuel has been consumed, and the number of miles corresponding thereto has been indicated by the pointer 40, the pin 71 returns to its zero position, and is pushed notch by notch toward its former position for each mile traveled on the succeeding gallon.

In the meantime, the arm 72 and pointer 40 remain in the positions they occupied when the preceding gallon caused the circuit to be closed by the contact 27 of the fluid metering device. It thus results that the number of miles traveled per gallon of fuel is only indicated for the preceding gallon consumed. If the number of miles corresponding to a succeeding gallon of fuel is less than the number of miles for a preceding gallon, then the pin 71 will not reach the arm 72, and the latter upon the closing of the circuit through the solenoid 51 will turn in a clockwise direction as seen in Figure 7 until said arm 72 contacts with said pin 71. While on the other hand, if a greater number of miles are traveled on a succeeding gallon of fuel then the pin 71 will contact with and push the arm 72 in a counter-clockwise direction as seen in Figure 7; and thus will the pointer 40 indicate the number of miles traveled on the said succeeding gallon, as soon as said gallon has been consumed.

Instead of employing an electromagnetic device for the actuation of the ratchet wheel 60, the mechanical connection such as that illustrated in Figure 9 may be employed if desired. In that form of the invention, a worm 85 may be mounted upon the shaft 86 which furnishes power to the speedometer 30, the said worm engaging with a worm wheel 87 carried by suitable shaft 88, leading to the indicating device 35. The said shaft 88 may be suitably connected to the operating pawl 62 or its associated parts as by a reduction gear and cam, so that said pawl 62 will be actuated once for each mile of travel as indicated by the speedometer 30.

It is obvious that those skilled in the art may vary the details of construction as well as the arrangement of parts without departing from the spirit of the invention, and therefore I do not wish to be limited to the above disclosure except as may be required by the claims.

What I claim is:—

1. In a device of the class described, the combination of a fluid measuring device provided with an electrical contact adapted to be closed upon the passage of each unit of fluid; means for measuring distance traveled comprising an indicator; a ratchet wheel provided with a pin coacting with said indicator; electrically actuated connections comprising an electromagnet and a pawl actuated by said magnet between said distance measuring means and said wheel adapted to turn said wheel and pin a predetermined distance for each mile traveled; a spring associated with said wheel for returning said wheel and pin to their initial or zero positions upon the closing of said contact; and additional electrically actuated connections comprising a solenoid and a bell crank actuated by said solenoid controlled by said contact governing the return of said wheel and pin to said zero positions.

2. In a device of the class described, the combination of a fluid measuring device provided with an electrical contact adapted to be closed upon the passage of each unit of fluid; means for measuring distance traveled comprising an indicator; a ratchet wheel provided with a pin coacting with said indicator; electrically actuated connections comprising an electromagnet and a pawl actuated by said magnet between said distance measuring means and said wheel adapted to turn said wheel and pin a predetermined distance for each mile traveled; a spring associated with said wheel for returning said wheel and pin to their initial or zero positions upon the closing of said contact; additional electrically actuated connections comprising a solenoid and a bell crank actuated by said solenoid controlled by said contact governing the return of said wheel and pin to said zero positions; and a second pin carried by said bell crank adapted when actuated by said solenoid to strike said pawl and disengage the same from said wheel.

3. In a device of the class described, the combination of a fluid measuring device provided with an electrical contact adapted to be closed upon the passage of each unit of fluid; means for measuring distance traveled comprising an indicator; a ratchet wheel provided with a pin coacting with said indicator; electrically actuated connections comprising an electro-magnet and a pawl actuated by said magnet between said distance measuring means and said wheel adapted to turn said wheel and pin a predetermined distance for each mile traveled; a spring associated with said wheel for returning said wheel and pin to their initial or zero positions upon the closing of said contact; additional electrically actuated connections comprising a solenoid and a bell crank actuated by said solenoid controlled by said contact governing the return of said wheel and pin to said zero positions; a second pin carried by said bell crank adapted when actuated by said solenoid to strike said pawl, disengaging the same from said wheel; and a detent for normally locking said wheel provided with an extension adapted to be struck by said pawl when the same is disengaged from said wheel, thereby unlocking said wheel and allowing the same to return to its initial or zero position.

In testimony whereof I affix my signature.

HUGH J. KNERR.